US011415681B2

(12) United States Patent
Gunnam

(10) Patent No.: US 11,415,681 B2
(45) Date of Patent: Aug. 16, 2022

(54) LIDAR BASED DISTANCE MEASUREMENTS WITH TIERED POWER CONTROL

(71) Applicant: Velodyne Lidar, Inc., Morgan Hill, CA (US)

(72) Inventor: Kiran K. Gunnam, Santa Clara, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 726 days.

(21) Appl. No.: 16/244,980

(22) Filed: Jan. 10, 2019

(65) Prior Publication Data

US 2020/0025896 A1 Jan. 23, 2020

Related U.S. Application Data

(60) Provisional application No. 62/615,877, filed on Jan. 10, 2018.

(51) Int. Cl.
*G01S 7/48* (2006.01)
*G01S 7/486* (2020.01)
*G01S 7/484* (2006.01)
*G01S 17/10* (2020.01)

(52) U.S. Cl.
CPC ........... *G01S 7/4868* (2013.01); *G01S 7/484* (2013.01); *G01S 17/10* (2013.01)

(58) Field of Classification Search
None
See application file for complete search history.

(56) References Cited

U.S. PATENT DOCUMENTS

| 7,969,558 B2 | 6/2011 | Hall |
| 8,675,181 B2 | 3/2014 | Hall |
| 8,767,190 B2 | 7/2014 | Hall |

(Continued)

FOREIGN PATENT DOCUMENTS

| EP | 3151036 A1 | 4/2017 |
| JP | H11352226 A | 12/1999 |
| WO | WO-89/07771 A1 | 8/1989 |

OTHER PUBLICATIONS

Extended European Search Report, dated Jul. 21, 2021, in European Patent Application 19847184.9.

(Continued)

*Primary Examiner* — Hovhannes Baghdasaryan
(74) *Attorney, Agent, or Firm* — Goodwin Procter LLP

(57) ABSTRACT

Methods and systems for controlling illumination power of a LIDAR based, three dimensional imaging system based on discrete illumination power tiers are described herein. In one aspect, the illumination intensity of a pulsed beam of illumination light emitted from a LIDAR system is varied in accordance with a set of illumination power tiers based on the difference between a desired and a measured return pulse. In a further aspect, the illumination power tier is selected based on whether an intensity difference exceeds one of a sequence of predetermined, tiered threshold values. In this manner, the intensity of measured return pulses is maintained within a linear range of the analog to digital converter for objects detected over a wide range of distances from the LIDAR system and a wide range of environmental conditions in the optical path between the LIDAR system and the detected object.

20 Claims, 11 Drawing Sheets

(56) References Cited

U.S. PATENT DOCUMENTS

| | | |
|---|---|---|
| 2008/0225273 A1 | 9/2008 | Ershov et al. |
| 2009/0303099 A1 | 12/2009 | Weilkes et al. |
| 2010/0076708 A1* | 3/2010 | Hukkeri ................. G01S 7/497 |
| | | 702/94 |
| 2012/0038903 A1 | 2/2012 | Weimer et al. |
| 2015/0266438 A1* | 9/2015 | Ghannam ............... B60R 19/20 |
| | | 293/117 |
| 2017/0269197 A1 | 9/2017 | Hall et al. |
| 2017/0343654 A1* | 11/2017 | Valois ................... G01S 17/931 |

OTHER PUBLICATIONS

International Search Report and Written Opinion, dated Jan. 22, 2020, for International Application No. PCT/US2019/013094.
Russian Search Report, dated Feb. 10, 2022, for Russian Patent Application No. 2020126335.
Russian Office Action, dated Feb. 17, 2022, for Russian Patent Application No. 2020126335.
Russian Decision to Grant Report, dated May 24, 2022, for Russian Patent Application No. 2020126335.
First Examination Report dated, May 5, 2022, for Indian Patent Application No. 202027027538.

* cited by examiner

LIDAR BASED DISTANCE MEASUREMENTS WITH TIERED POWER CONTROL

CROSS REFERENCE TO RELATED APPLICATION

The present application for patent claims priority under 35 U.S.C. § 119 from U.S. provisional patent application Ser. No. 62/615,877 entitled "LIDAR Based Distance Measurements With Tiered Power Control," filed Jan. 10, 2018, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Existing LIDAR systems employ a beam of light to interrogate a particular volume of the surrounding environment at any given time. The detection of return signals includes significant sources of measurement noise that are exacerbated as measurement ranges are extended. In many applications, the signal to noise ratio of measured signals is improved by increasing laser pulse intensity. However, increased laser pulse intensity may result in saturation of the detector, signal conditioning electronics, analog-to-digital converters, or any combination thereof, particularly for short range measurements.

Improvements in power control of LIDAR systems are desired, while maintaining high levels of imaging resolution and range.

SUMMARY

Methods and systems for controlling illumination power of a LIDAR based, three dimensional imaging system based on discrete illumination power tiers are described herein.

In one aspect, the illumination intensity of a pulsed beam of illumination light emitted from a LIDAR system is varied based on the intensity of measured return pulses. In this manner, the intensity of measured return pulses is maintained within a linear range of the ADC for objects detected over a wide range of distances from the LIDAR system and a wide range of environmental conditions in the optical path between the LIDAR system and the detected object. By maintaining the intensity of measured return pulses within the linear range of the ADC, both low signal to noise ratio and saturation are avoided.

In some embodiments, an illumination power control module generates a control signal based on a difference between a desired intensity level and a measured intensity level. The control signal is communicated to an illumination driver IC that causes the illumination driver IC to change the intensity of the illumination generated by an illumination source from one discrete illumination power level to another. In these embodiments, the control signal is a digital signal indicative of a desired illumination power level.

In another aspect, an illumination power control module determines the desired illumination power level based on whether an intensity difference exceeds one of a sequence of predetermined, tiered threshold values.

The values of the intensity difference thresholds are predetermined values (i.e., values are known before the determination of the difference between the desired and measured return pulse intensity). In some embodiments, the value of each intensity difference threshold is stored in a look-up table. In some embodiments, the value of each intensity difference threshold is characterized by a nonlinear function. In some embodiments, the value of each intensity difference threshold depends on the current power level. In some embodiments, the values of each intensity difference threshold vary by a fixed scaling factor. In some embodiments, the value of the each intensity difference threshold depends on whether the difference between the desired and measured return intensity signals is positive or negative.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
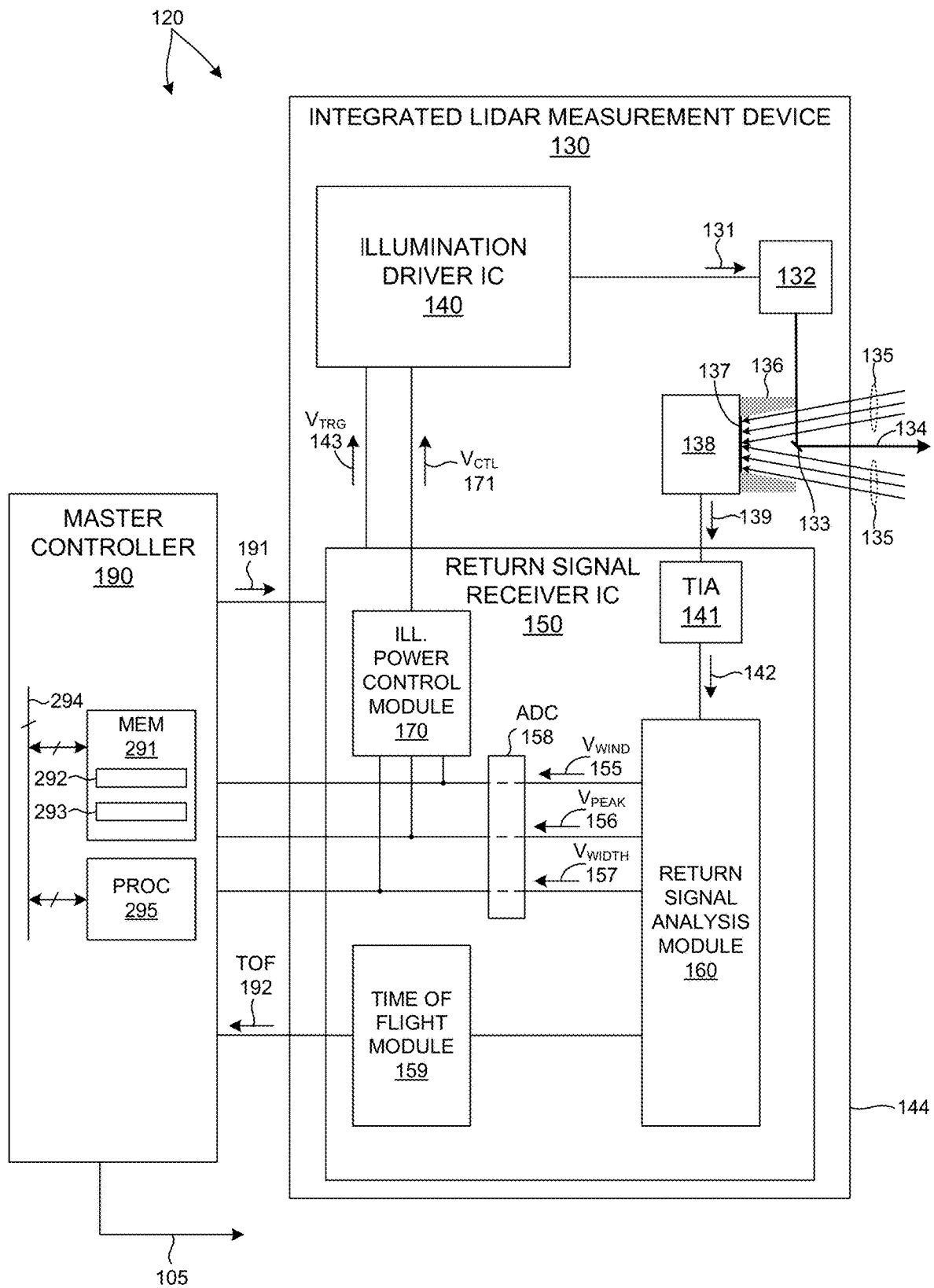
FIG. 1 is a diagram illustrative of an operational scenario including a LIDAR based, three dimensional imaging system 120 configured to implement tiered illumination power control in one embodiment.

FIG. 1 depicts a LIDAR measurement system 120 in one embodiment. LIDAR measurement system 120 includes a master controller 190 and one or more integrated LIDAR measurement devices 130. An integrated LIDAR measurement device 130 includes a return signal receiver integrated circuit (IC) 150, an illumination driver integrated circuit (IC) 140, an illumination source 132, a photodetector 138, and a trans-impedance amplifier (TIA) 141. In the embodiment depicted in FIG. 1, each of these elements is mounted to a common substrate 144 (e.g., printed circuit board) that provides mechanical support and electrical connectivity among the elements.

In addition, in some embodiments, an integrated LIDAR measurement device includes one or more voltage supplies that provide voltage to the electronic elements mounted to substrate 144 and electrical power to the illumination source 132. The voltage supplies may be configured to supply any suitable voltage. In some embodiments, one or more of the voltage supplies are mounted to substrate 144. However, in general, any of the voltage supplies described herein may be mounted to a separate substrate and electrically coupled to the various elements mounted to substrate 144 in any suitable manner.

Master controller 190 is configured to generate a pulse command signal 191 that is communicated to receiver IC 150 of integrated LIDAR measurement device 130. In general, a LIDAR measurement system includes a number of different integrated LIDAR measurement devices 130. In these embodiments, master controller 190 communicates a pulse command signal 191 to each different integrated LIDAR measurement device. In this manner, master controller 190 coordinates the timing of LIDAR measurements performed by any number of integrated LIDAR measurement devices.

Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 140 and data acquisition by receiver IC 150. However, illumination driver IC 140 and receiver IC 150 do not share the same clock as master controller 190. For this reason, precise estimation of time of flight becomes much more computationally tedious when the pulse command signal 191 is directly used to trigger pulse generation and data acquisition.

In the depicted embodiment, receiver IC 150 receives pulse command signal 191 and generates a pulse trigger signal, $V_{TRG}$ 143, in response to the pulse command signal 191. Pulse trigger signal 143 is communicated to illumination driver IC 140 and directly triggers illumination driver IC 140 to provide an electrical pulse 131 to illumination source 132, which causes illumination source 132 to generate a pulse of illumination light 134. In addition, pulse trigger signal 143 directly triggers data acquisition of return signal 142 and associated time of flight calculation. In this manner, pulse trigger signal 143 generated based on the internal clock of receiver IC 150 is employed to trigger both pulse generation and return pulse data acquisition. This ensures precise synchronization of pulse generation and return pulse acquisition which enables precise time of flight calculations.

Illumination source 132 emits a measurement pulse of illumination light 134 in response to a pulse of electrical current 131. The illumination light 134 is focused and projected onto a particular location in the surrounding environment by one or more optical elements of the LIDAR system.

In some embodiments, the illumination source 132 is laser based (e.g., laser diode). In some embodiments, the illumination source is based on one or more light emitting diodes. In general, any suitable pulsed illumination source may be contemplated.

As depicted in FIG. 1, illumination light 134 emitted from integrated LIDAR measurement device 130 and corresponding return measurement light 135 reflected back toward integrated LIDAR measurement device 130 share a common optical path. Integrated LIDAR measurement device 130 includes a photodetector 138 having an active sensor area 137. As depicted in FIG. 1, illumination source 132 is located outside the field of view of the active area 137 of the photodetector. As depicted in FIG. 1, an overmold lens 136 is mounted over the photodetector 138. The overmold lens 136 includes a conical cavity that corresponds with the ray acceptance cone of return light 135. Illumination light 134 from illumination source 132 is injected into the detector reception cone by a fiber waveguide. An optical coupler optically couples illumination source 132 with the fiber waveguide. At the end of the fiber waveguide, a mirror element 133 is oriented at an angle (e.g., 45 degrees) with respect to the waveguide to inject the illumination light 134 into the cone of return light 135. In one embodiment, the end faces of the fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 134 into the acceptance cone of return light 135 with minimal occlusion.

The placement of the waveguide within the acceptance cone of the return light 135 projected onto the active sensing area 137 of detector 138 is selected to ensure that the illumination spot and the detector field of view have maximum overlap in the far field.

As depicted in FIG. 1, return light 135 reflected from the surrounding environment is detected by photodetector 138. In some embodiments, photodetector 138 is an avalanche photodiode. Photodetector 138 generates an output signal 139 that is received and amplified by TIA 141. The amplified return signal 142 is communicated to return signal analysis module 160. In general, the amplification of output signal 139 may include multiple, amplifier stages. In this sense, an analog trans-impedance amplifier is provided by way of non-limiting example, as many other analog signal amplification schemes may be contemplated within the scope of this patent document. Although TIA 141 is integrated with return signal receiver IC 150 as depicted in FIG. 1, in general, TIA 141 may be implemented as a discrete device separate from the receiver IC 150. In some embodiments, it is preferable to integrate TIA 141 with receiver IC 150 to save space and reduce signal contamination.

Return signal receiver IC 150 is a mixed analog/digital signal processing IC. In the embodiment depicted in FIG. 1, return signal receiver IC 150 includes TIA 141, a return signal analysis module 160, a time of flight calculation module 159, an illumination power control module 170, and an analog to digital conversion module 158.

Return signal receiver IC 150 performs several functions. In the embodiment depicted in FIG. 1, receiver IC 150 identifies one or more return pulses of light reflected from one or more objects in the surrounding environment in response to the pulse of illumination light 134, and determines a time of flight associated with each of these return pulses. In general, the output signal 139 is processed by return signal receiver IC 150 for a period of time that corresponds with the time of flight of light from the LIDAR measurement device 130 to a distance equal to the maximum range of the device 130, and back to the device 130. During this period of time, the illumination pulse 134 may encounter several objects at different distances from the integrated LIDAR measurement device 130. Thus, output signal 139 may include several pulses, each corresponding to a portion of the illumination beam 134 reflected from different reflective surfaces located at different distances from device 130. In another aspect, receiver IC 150 determines various properties of each of the return pulses. As depicted in FIG. 1, return signal analysis module 160 determines an indication of a width of each return pulse, $V_{WIDTH}$ 157, determines the peak amplitude of each return pulse, $V_{PEAK}$ 156, and samples each return pulse waveform individually over a sampling window that includes the peak amplitude of each return pulse waveform, $V_{WIND}$ 155. These signal properties and timing information are converted to digital signals by ADC 158 and communicated to illumination power control module 170 and to master controller 190. Master controller 190 may further process this data, or communicate this data directly to an external computing device for further image processing (e.g., by a user of the LIDAR measurement system 120).

Figure 2:
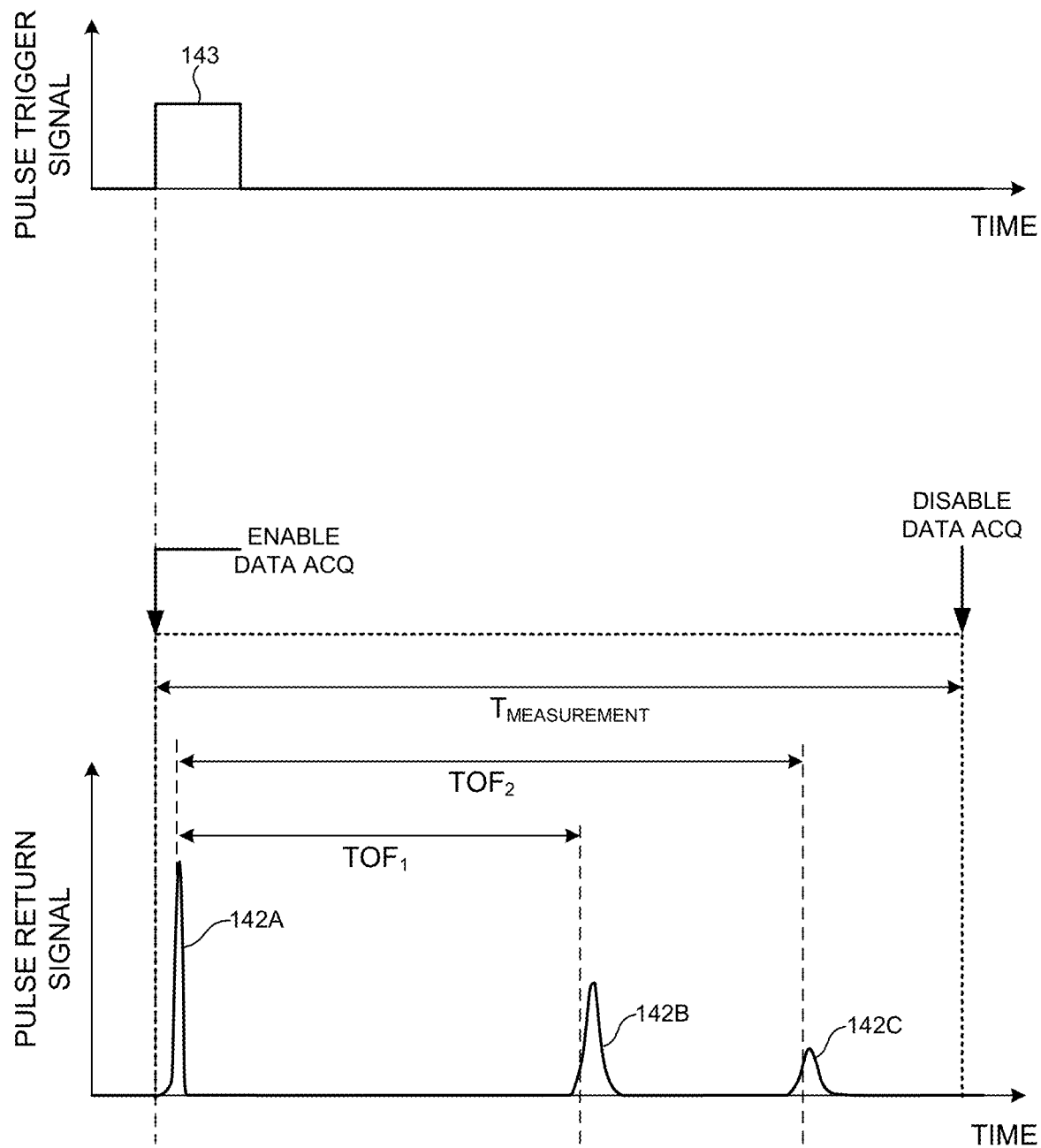
FIG. 2 is a diagram illustrative of the timing associated with the emission of a measurement pulse from an integrated LIDAR measurement device 130 and capture of the returning measurement pulse.

FIG. 2 depicts an illustration of the timing associated with the emission of a measurement pulse from an integrated LIDAR measurement device 130 and capture of the returning measurement pulse. As depicted in FIG. 2, a measurement is initiated by the rising edge of pulse trigger signal 143 generated by receiver IC 150. As depicted in FIGS. 1 and 2, an amplified, return signal 142 is generated by TIA 141. As described hereinbefore, a measurement window (i.e., a period of time over which collected return signal data is associated with a particular measurement pulse) is initiated by enabling data acquisition at the rising edge of pulse trigger signal 143. Receiver IC 150 controls the duration of the measurement window, $T_{measurement}$, to correspond with the window of time when a return signal is expected in response to the emission of a measurement pulse sequence. In some examples, the measurement window is enabled at the rising edge of pulse trigger signal 143 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 142 includes three return measurement pulses that correspond with the emitted measurement pulse. In general, signal detection is performed on all detected measurement pulses. In one example, signal analysis may be performed to identify the closest valid signal 142B (i.e., first valid instance of the return measurement pulse), the strongest signal, and the furthest valid signal 142C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 143 and each valid return pulse (i.e., 142B and 142C) introduces undesirable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In the depicted embodiment, receiver IC 150 measures time of flight based on the time elapsed between the detection of a detected pulse 142A due to internal cross-talk between the illumination source 132 and photodetector 138 and a valid return pulse (e.g., 142B and 142C). In this manner, systematic delays are eliminated from the estimation of time of flight. Pulse 142A is generated by internal cross-talk with effectively no distance of light propagation. Thus, the delay in time from the rising edge of the pulse trigger signal and the instance of detection of pulse 142A captures all of the systematic delays associated with illumination and signal detection. By measuring the time of flight of valid return pulses (e.g., return pulses 142B and 142C) with reference to detected pulse 142A, all of the systematic delays associated with illumination and signal detection due to internal cross-talk are eliminated. As depicted in FIG. 2, receiver IC 150 estimates the time of flight, $TOF_1$, associated with return pulse 142B and the time of flight, $TOF_2$, associated with return pulse 142C with reference to return pulse 142A.

In some embodiments, the signal analysis is performed by receiver IC 150, entirely. In these embodiments, time of flight signals 192 communicated from integrated LIDAR measurement device 130 include an indication of the time of flight of each return pulse determined by receiver IC 150. In some embodiments, signals 155-157 include waveform information associated with each return pulse generated by receiver IC 150. This waveform information may be processed further by one or more processors located on board the 3-D LIDAR system, or external to the 3-D LIDAR system to arrive at another estimate of distance, an estimate of one of more physical properties of the detected object, or a combination thereof.

In one aspect, the illumination intensity of a pulsed beam of illumination light emitted from a LIDAR system is varied based on the intensity of measured return pulses. In this manner, the intensity of measured return pulses is maintained within a linear range of the ADC for objects detected over a wide range of distances from the LIDAR system and a wide range of environmental conditions in the optical path between the LIDAR system and the detected object. By maintaining the intensity of measured return pulses within the linear range of the ADC, both low signal to noise ratio and saturation are avoided.

Figure 3:
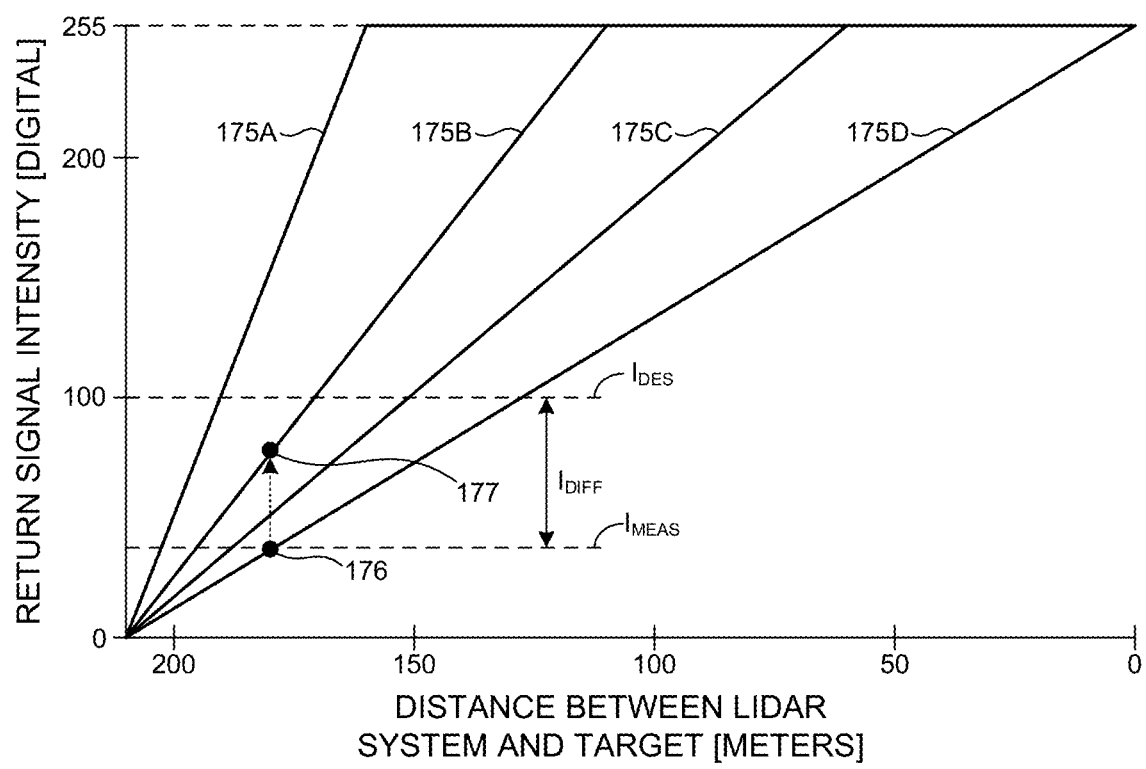
FIG. 3 is a simplified diagram illustrative of return signal intensity as a function of distance between a LIDAR system and the target under measurement for four different illumination power levels.

FIG. 3 depicts an illustrative plot of return signal intensity as a function of distance between a LIDAR system and the target under measurement for four different illumination power levels 175A-D. As illustrated in FIG. 3, the return signal intensity is an 8-bit digital value indicative of the intensity of the measured return signal 139. However, in general, the return signal intensity may be characterized by any suitable digital or analog signal.

As illustrated in FIG. 3, the range of measurement distances that fall within a linear range of the measurement system varies depending on illumination power level. For example, as illustrated in FIG. 3, plotline 175A characterizes the response of the LIDAR measurement system at a relatively high power level. At this power level, a high signal to noise ratio (e.g., signal intensity greater than fifty) is expected at measurement distances between 200 meters and 160 meters. However, at distances below 160 meters, the LIDAR measurement system saturates. At reduced power levels 175B, 175C, and 175D, the LIDAR system saturates at progressively smaller distances, but at a cost of reduced signal to noise ratio (i.e., reduced signal intensity) for a given distance.

The intensity of the return signal may be determined in many different ways. In the embodiment depicted in FIG. 1, return signal analysis module 160 determines a width of each return pulse, $V_{WIDTH}$ 157, a peak amplitude of each return pulse, $V_{PEAK}$ 156, and a sampling window that includes the peak amplitude of each return pulse waveform, $V_{WIND}$ 155. These signal properties and timing information are converted to digital signals by ADC 158 and communicated to illumination power control module 170. In one embodiment, illumination power control module 170 determines the intensity of the return signal as the peak amplitude of each return pulse, $V_{PEAK}$ 156. In another embodiment, illumination power control module 170 determines the intensity of the return signal as the average value of the peak amplitude of each return pulse within sampling window, $V_{WIND}$ 155. In another embodiment, illumination power control module 170 determines the intensity of the return signal as the mean value of the peak amplitude of each return pulse within sampling window, $V_{WIND}$ 155. In another embodiment, illumination power control module 170 determines the intensity of the return signal as a combination of a peak value, $V_{PEAK}$ 156, and pulse width, $V_{WIDTH}$ 157 associated with each return pulse. In general, any suitable indication of the intensity of the return signal 139 may be contemplated within the scope of this patent document.

In some other embodiments, return signal analysis module 160 communicates values of any of $V_{WIDTH}$ 157, $V_{PEAK}$ 156, and $V_{WIND}$ 155 as analog signals (without conversion by ADC 158). In these embodiments, illumination power control module 170 determines the desired illumination power level based on the analog signals.

An exemplary measurement 176 of intensity, $I_{MEAS}$, of a return signal is depicted in FIG. 3. As depicted in FIG. 3, the measured intensity, $I_{MEAS}$, is significantly lower than a desired intensity level, $I_{DES}$. In the example depicted in FIG. 3, the desired intensity level is near the middle of the range of ADC 158 (i.e., digital signal value of 100).

In one aspect, illumination power control module 170 generates a control signal, $V_{CTL}$ 171, based on the difference, $I_{DIFF}$, between the desired intensity level, $I_{DES}$, and the measured intensity level, $I_{MEAS}$. $V_{CTL}$ 171 is communicated to illumination driver IC 140 and causes illumination driver IC 140 to increase the intensity of the illumination beam 134 generated by illumination source 132 from the illumination power level associated with plotline 175D to a higher illumination power level associated with plotline 175B. As depicted in FIG. 3, the expected measured intensity 177 at the higher power level is much closer to the desired intensity level.

In one embodiment, $V_{CTL}$ 171 is a digital signal indicative of a desired illumination power level. In this embodiment, illumination driver IC 140 adjusts the illumination power level to the desired power level in response to the value of $V_{CTL}$ 171. In one embodiment, $V_{CTL}$ 171 is a 4-bit digital number that indicates any of sixteen different power levels depending on the value of $V_{CTL}$ 171. However, in general, any number of different, discrete illumination power levels may be considered within the scope of this patent document.

In another aspect, illumination power control module 170 determines the desired illumination power level based on whether the intensity difference, $I_{DIFF}$, exceeds one of a sequence of predetermined, tiered threshold values.

FIGS. 4A-4D depict an illustration of an illumination power control scheme based on predetermined, threshold values in one embodiment. In the example depicted in FIGS. 4A-4D, a LIDAR measurement system includes four illumination power levels, L1, L2, L3, and L4 in order of increasing illumination power. In one example, L1 (lowest power level) corresponds to system response curve 175D depicted in FIG. 3, L2 corresponds to system response curve 175C, L3 corresponds to system response curve 175B, and L4 corresponds to system response curve 175A.

Figure 4A:
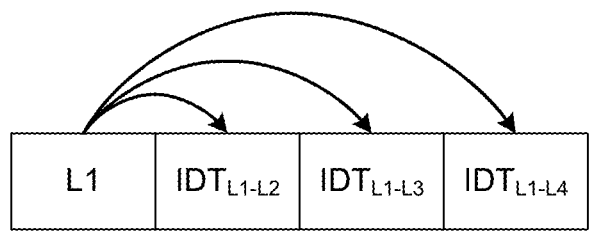
FIGS. 4A-4D depict an illustration of an illumination power control scheme based on predetermined, threshold values in one embodiment.

As depicted in FIG. 4A, if the difference between a desired intensity of the return signal and the measured intensity of the return signal exceeds an intensity difference threshold, $IDT_{L1-L2}$, illumination power control module 170 communicates a value of control signal, $V_{CTL}$ 171, that causes illumination driver 140 to increase illumination power from L1 to L2. Similarly, if the difference between a desired intensity of the return signal and the measured intensity of the return signal exceeds an intensity difference threshold, $IDT_{L1-L3}$, illumination power control module 170 communicates a value of control signal, $V_{CTL}$ 171 that causes illumination driver 140 to increase illumination power from L1 to L3. Similarly, if the difference between a desired intensity of the return signal and the measured intensity of the return signal exceeds an intensity difference threshold, $IDT_{L1-L4}$, illumination power control module 170 communicates a value of control signal, $V_{CTL}$ 171 that causes illumination driver 140 to increase illumination power from L1 to L4.

Figure 4B:
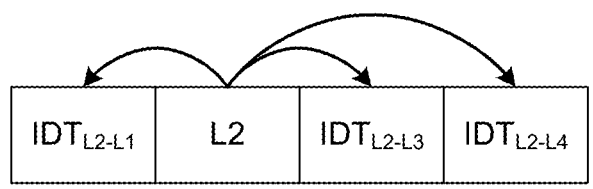

As depicted in FIG. 4B, if the difference between a desired intensity of the return signal and the measured intensity of the return signal exceeds an intensity difference threshold, $IDT_{L2-L3}$, illumination power control module 170 communicates a value of control signal, $V_{CTL}$ 171, that causes illumination driver 140 to increase illumination power from L2 to L3. Similarly, if the difference between a desired intensity of the return signal and the measured intensity of the return signal exceeds an intensity difference threshold, $IDT_{L2-L4}$, illumination power control module 170 communicates a value of control signal, $V_{CTL}$ 171 that causes illumination driver 140 to increase illumination power from L2 to L4. Similarly, if the difference between a desired intensity of the return signal and the measured intensity of the return signal exceeds an intensity difference threshold, $IDT_{L2-L1}$, illumination power control module 170 communicates a value of control signal, $V_{CTL}$ 171 that causes illumination driver 140 to decrease illumination power from L2 to L1.

Figure 4C:
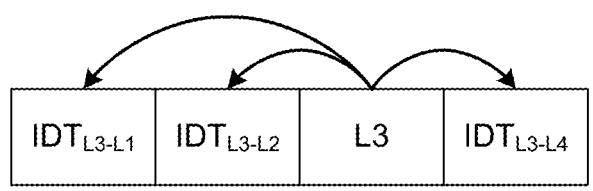

As depicted in FIG. 4C, if the difference between a desired intensity of the return signal and the measured intensity of the return signal exceeds an intensity difference threshold, $IDT_{L3-L4}$, illumination power control module 170 communicates a value of control signal, $V_{CTL}$ 171, that causes illumination driver 140 to increase illumination power from L3 to L4. Similarly, if the difference between a desired intensity of the return signal and the measured intensity of the return signal exceeds an intensity difference threshold, $IDT_{L3-L2}$, illumination power control module 170 communicates a value of control signal, $V_{CTL}$ 171 that causes illumination driver 140 to decrease illumination power from L3 to L2. Similarly, if the difference between a desired intensity of the return signal and the measured intensity of the return signal exceeds an intensity difference threshold, $IDT_{L3-L1}$, illumination power control module 170 communicates a value of control signal, $V_{CTL}$ 171 that causes illumination driver 140 to decrease illumination power from L3 to L1.

Figure 4D:
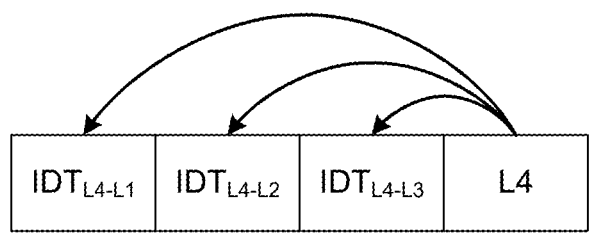

As depicted in FIG. 4D, if the difference between a desired intensity of the return signal and the measured intensity of the return signal exceeds an intensity difference threshold, $IDT_{L4-L3}$, illumination power control module 170 communicates a value of control signal, $V_{CTL}$ 171 that causes illumination driver 140 to decrease illumination power from L4 to L3. Similarly, if the difference between a desired intensity of the return signal and the measured intensity of the return signal exceeds an intensity difference threshold, $IDT_{L4-L2}$, illumination power control module 170 communicates a value of control signal, $V_{CTL}$ 171 that causes illumination driver 140 to increase illumination power from L4 to L2. Similarly, if the difference between a desired intensity of the return signal and the measured intensity of the return signal exceeds an intensity difference threshold, $IDT_{L4-L1}$, illumination power control module 170 communicates a value of control signal, $V_{CTL}$ 171, that causes illumination driver 140 to increase illumination power from L4 to L1.

The values of the intensity difference thresholds are predetermined values (i.e., values are known before the determination of the difference between the desired and measured return pulse intensity). In some embodiments, the value of each intensity difference threshold is stored in a look-up table. In some embodiments, the value of each intensity difference threshold is characterized by a nonlinear function. In some embodiments, the value of each intensity difference threshold depends on the current power level. In some embodiments, the values of each intensity difference threshold vary by a fixed scaling factor. In some embodiments, the value of the each intensity difference threshold depends on whether the difference between the desired and measured return intensity signals is positive or negative.

In the embodiment depicted in FIG. 1, illumination power control module 170 generates a digital signal $V_{CTL}$ 171 to communicate a desired illumination power level to illumination driver IC 140. However, in some other embodiments, illumination power control module 170 generates one or more analog signals that are communicated to illumination driver IC 140 that cause illumination driver IC 140 to generate illumination pulses 134 at the desired illumination power level. In one example, illumination power control module 170 communicates an analog amplitude control signal, $V_{AMP}$, to illumination driver IC 140. In response, illumination driver IC 140 changes the pulse amplitude based on the received value of $V_{AMP}$. In another example, illumination power control module 170 communicates an analog amplitude control signal, $V_{PWC}$, to illumination driver IC 140. In response, illumination driver IC 140 changes the illumination pulse duration based on the received value of $V_{PWC}$.

Figure 5:
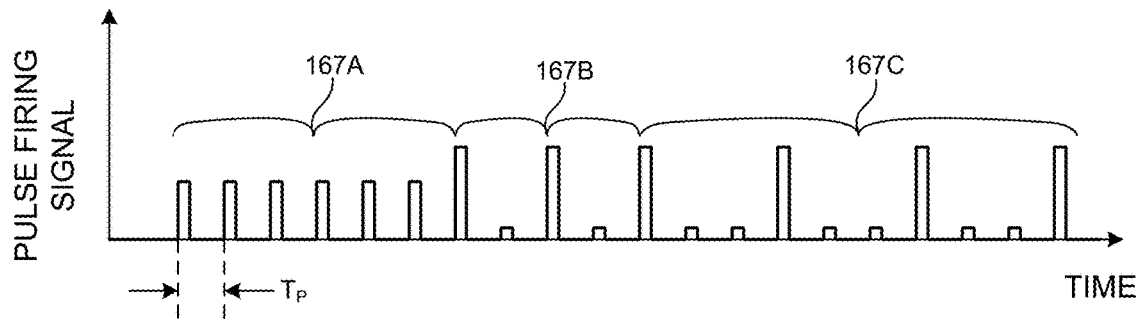
FIG. 5 depicts a simplified diagram illustrative of three segments of a pulse firing signal generated by controller 140 that is periodic with period, $T_p$.

FIG. 5 depicts three segments of a pulse firing signal generated by controller 140 that is periodic with period, $T_p$. In segment 167A, the pulse intensity for six consecutive pulses is held steady at a medium value. In segment, 167B, the pulse intensity alternates between a high intensity setting and a low intensity setting for six consecutive pulses. In segment 167C, the pulse intensity is held high for one pulse, then low for two subsequent pulses for ten consecutive pulses. In general, a LIDAR system may be configured to vary the pulse intensity in any desired manner on a pulse by pulse basis or in groups of pulses to maintain the intensity of the return signal within a linear range of the LIDAR measurement system.

Figure 6:
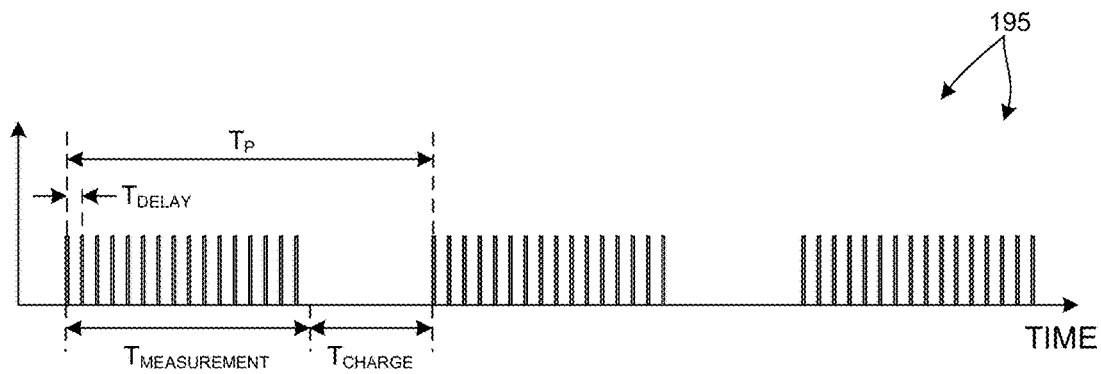
FIG. 6 is a simplified diagram illustrative of the timing of light emission from each of sixteen integrated LIDAR measurement devices.
Figure 8:
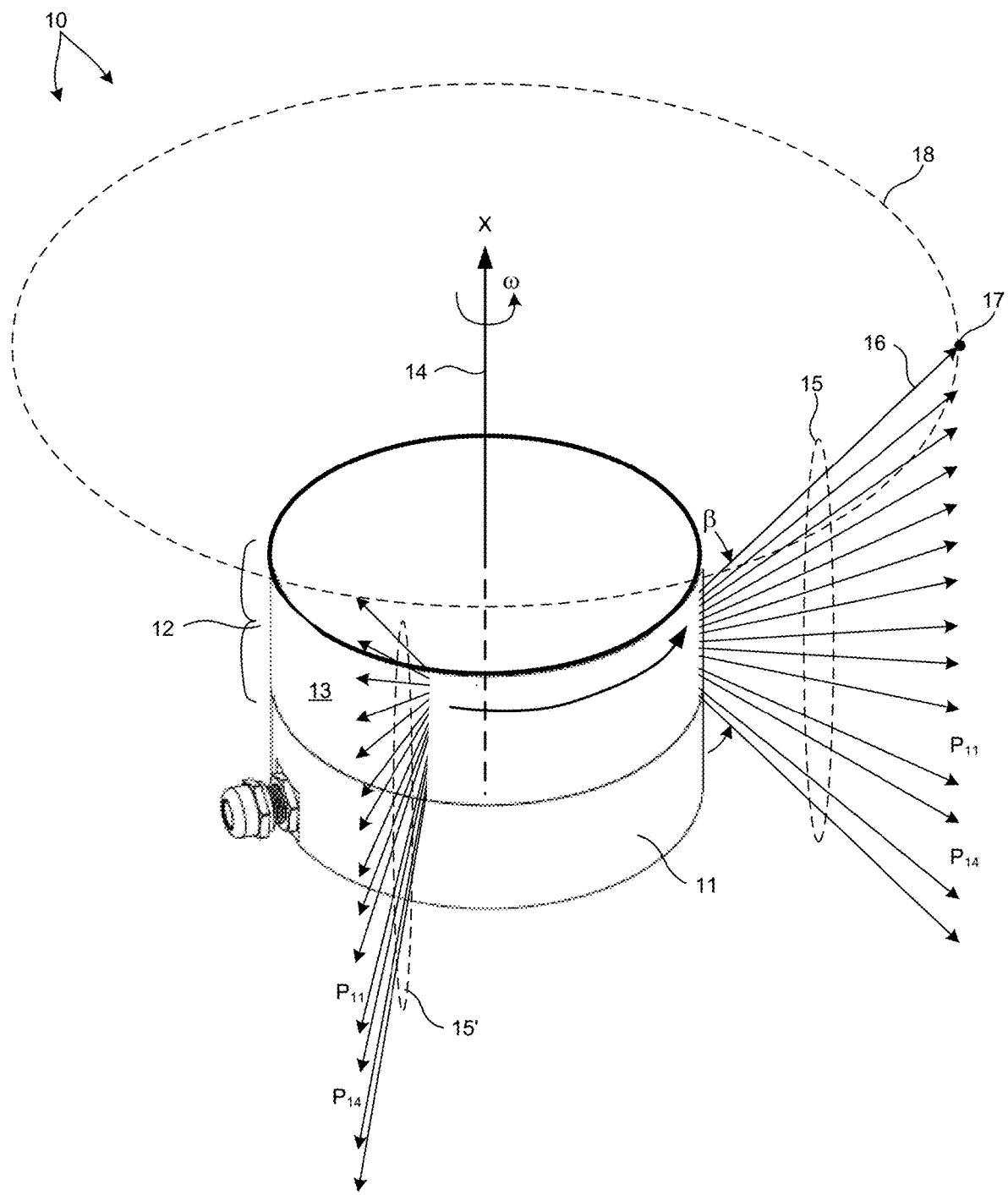
FIG. 8 is a diagram illustrative of another embodiment of a 3-D LIDAR system 10 configured to implement tiered illumination power control.

In a further embodiment, a LIDAR system, such as LIDAR system 10 depicted in FIG. 8, includes a number of integrated LIDAR measurement devices operating in coordination with a common controller (e.g., controller 190). FIG. 6 depicts an exemplary diagram 195 illustrating the timing of light emission from each of the sixteen integrated LIDAR measurement devices. In another further aspect, the repetitive pattern of pulses of illumination light emitted from each pulsed illumination system is independently controllable. Thus, the repetition pattern associated with each pulsed illumination system can be independently controlled.

As depicted in FIG. 6, a measurement pulse sequence is emitted from a first integrated LIDAR measurement device. After a delay time, $T_{DELAY}$, a measurement pulse sequence is emitted from a second integrated LIDAR measurement device. In this manner a sequence of sixteen measurement pulses are emitted in different directions from the LIDAR device during a measurement period, $T_{MEASUREMENT}$. The energy storage elements associated with each of the sixteen pulsed illumination systems are charged after the measurement period for a charging period, $T_{CHARGE}$. After, the charging period, another measurement pulse sequence is emitted from each pulsed illumination system over a subsequent measurement period.

In some embodiments, the delay time is set to be greater than the time of flight of the measurement pulse sequence to and from an object located at the maximum range of the LIDAR device. In this manner, there is no cross-talk among any of the sixteen pulsed illumination systems.

In some other embodiments, a measurement pulse may be emitted from one pulsed illumination system before a measurement pulse emitted from another pulsed illumination system has had time to return to the LIDAR device. In some of these embodiments, care is taken to ensure that there is sufficient spatial separation between the areas of the surrounding environment interrogated by each beam to avoid cross-talk.

In another aspect, a master controller is configured to generate a plurality of pulse command signals, each communicated to a different integrated LIDAR measurement device. Each return pulse receiver IC generates a corresponding pulse control signal based on the received pulse command signal.

Figure 7:
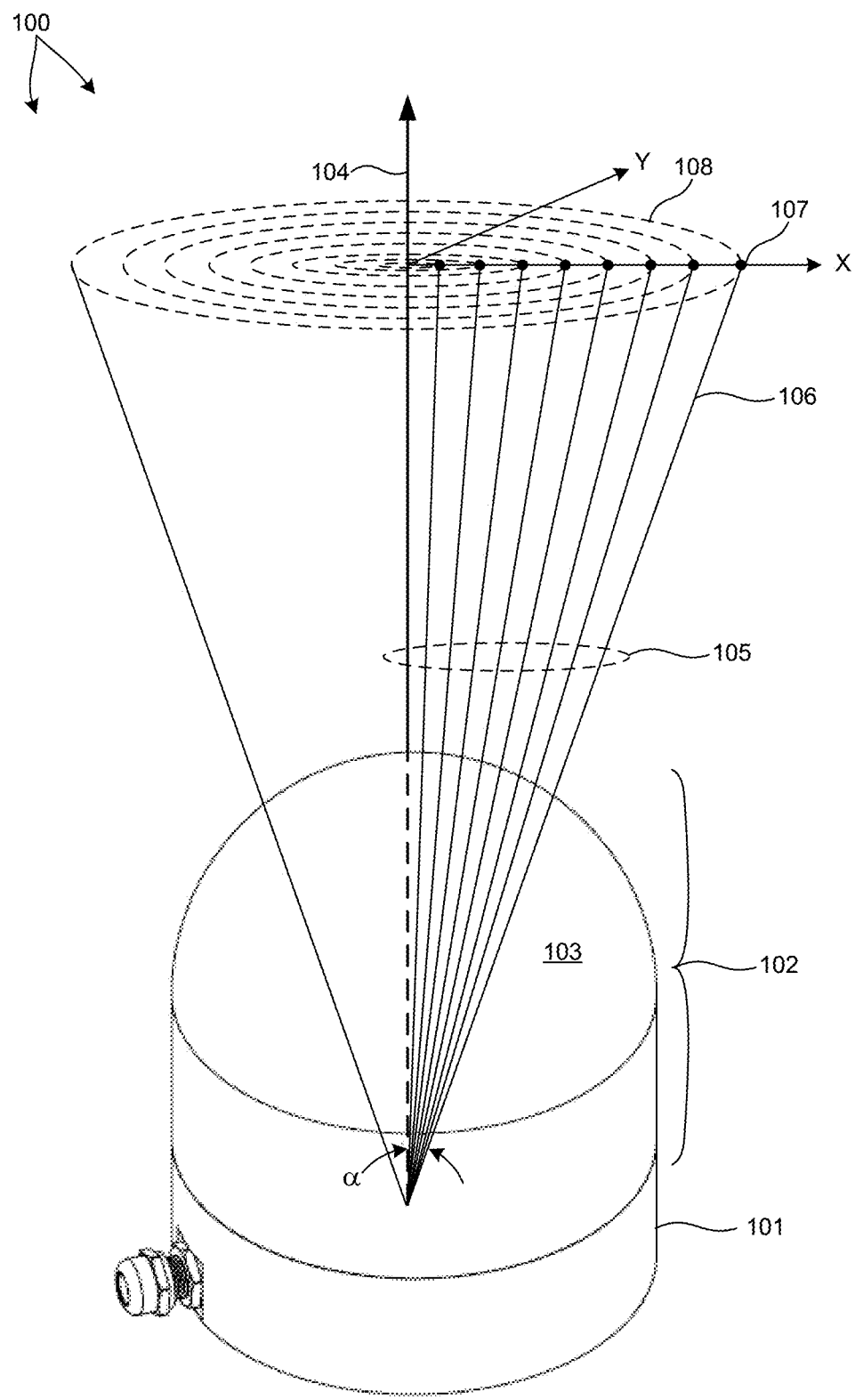
FIG. 7 is a diagram illustrative of an embodiment of a 3-D LIDAR system 100 configured to implement tiered illumination power control.
Figure 9:
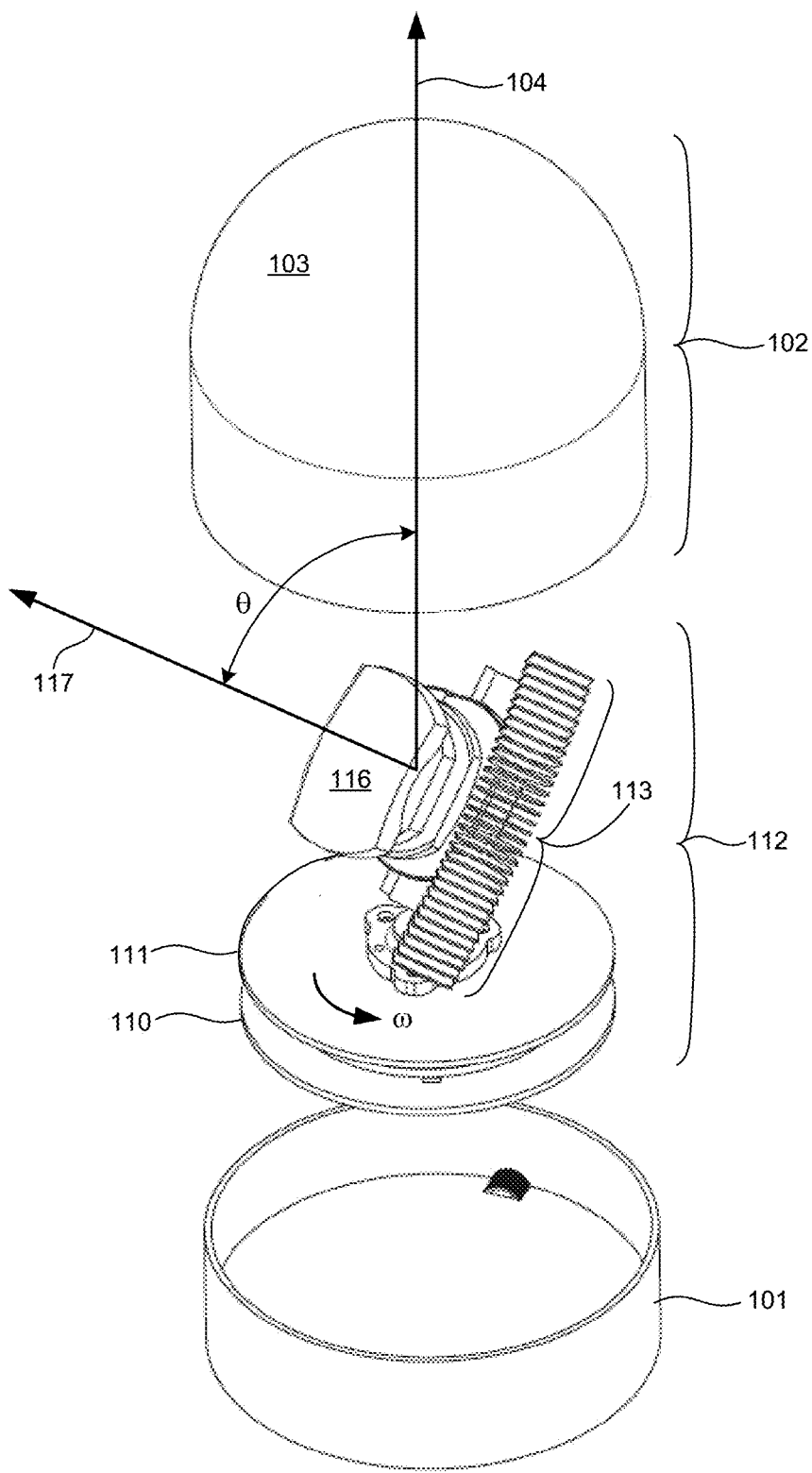
FIG. 9 is a diagram illustrative of an exploded view of 3-D LIDAR system 100 in one exemplary embodiment.

FIGS. 7-9 depict 3-D LIDAR systems that include multiple integrated LIDAR measurement devices. In some embodiments, a delay time is set between the firing of each integrated LIDAR measurement device. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

FIG. 7 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 7, a plurality of beams of light 105 are emitted from 3-D LIDAR system 100 through domed shell element 103 over an angular range, a, measured from a central axis 104. In the embodiment depicted in FIG. 7, each beam of light is projected onto a plane defined by the x and y axes at a plurality of different locations spaced apart from one another. For example, beam 106 is projected onto the xy plane at location 107.

In the embodiment depicted in FIG. 7, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

FIG. 8 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 8, a plurality of beams of light 15 are emitted from 3-D LIDAR system 10 through cylindrical shell element 13 over an angular range, β. In the embodiment depicted in FIG. 8, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 8, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

FIG. 9 depicts an exploded view of 3-D LIDAR system 100 in one exemplary embodiment. 3-D LIDAR system 100 further includes a light emission/collection engine 112 that rotates about central axis 104. In the embodiment depicted in FIG. 9, a central optical axis 117 of light emission/collection engine 112 is tilted at an angle, θ, with respect to central axis 104. As depicted in FIG. 9, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, w.

As depicted in FIG. 9, light emission/collection engine 112 includes an array of integrated LIDAR measurement devices 113. In one aspect, each integrated LIDAR measurement device includes a light emitting element, a light detecting element, and associated control and signal conditioning electronics integrated onto a common substrate (e.g., printed circuit board or other electrical circuit board).

Light emitted from each integrated LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 9. In general, any number of LIDAR measurement devices can be arranged to simultaneously emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 10:
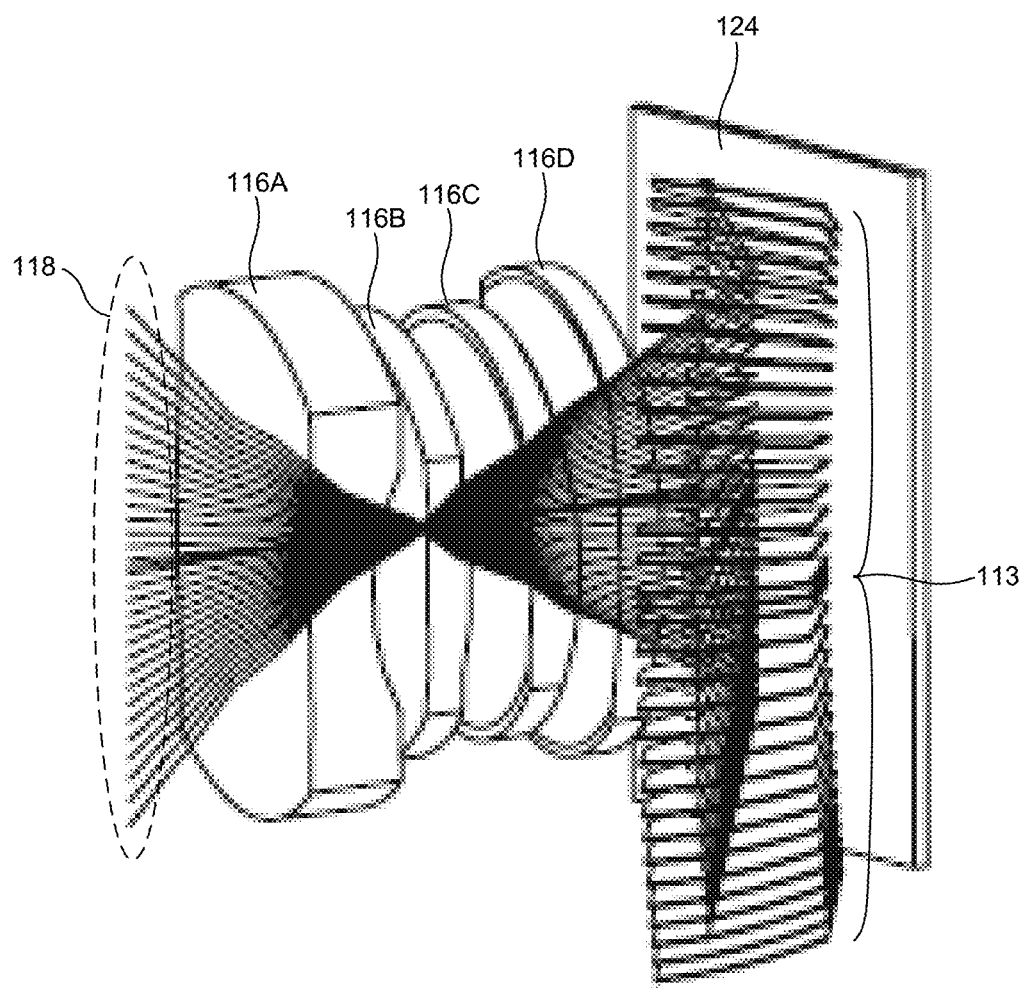
FIG. 10 depicts a view of optical elements 116 in greater detail.

FIG. 10 depicts a view of optical elements 116 in greater detail. As depicted in FIG. 10, optical elements 116 include four lens elements 116A-D arranged to focus collected light 118 onto each detector of the array of integrated LIDAR measurement devices 113. In the embodiment depicted in FIG. 10, light passing through optics 116 is reflected from mirror 124 and is directed onto each detector of the array of integrated LIDAR measurement devices 113. In some embodiments, one or more of the optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 11:
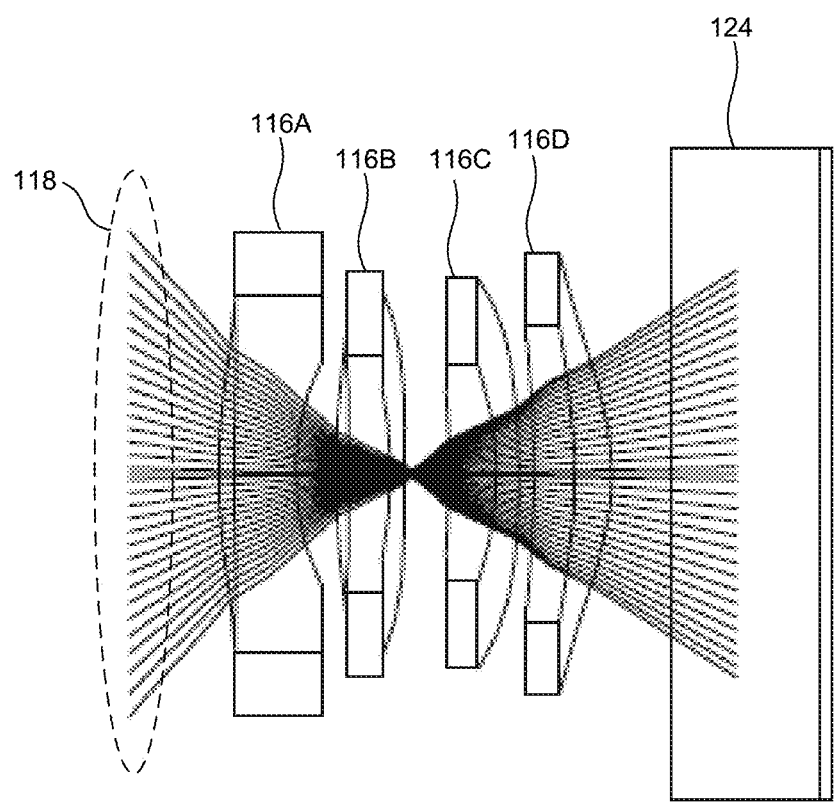
FIG. 11 depicts a cutaway view of optics 116 to illustrate the shaping of each beam of collected light 118.

FIG. 11 depicts a cutaway view of optics 116 to illustrate the shaping of each beam of collected light 118.

In this manner, a LIDAR system, such as 3-D LIDAR system 10 depicted in FIG. 8, and system 100, depicted in FIG. 7, includes a plurality of integrated LIDAR measurement devices each emitting a pulsed beam of illumination light from the LIDAR device into the surrounding environment and measuring return light reflected from objects in the surrounding environment.

In some embodiments, such as the embodiments described with reference to FIG. 7 and FIG. 8, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

In a further aspect, one or more integrated LIDAR measurement devices are in optical communication with an optical phase modulation device that directs the illumination beam(s) generated by the one or more integrated LIDAR measurement devices in different directions. The optical phase modulation device is an active device that receives a control signal that causes the optical phase modulation device to change state and thus change the direction of light diffracted from the optical phase modulation device. In this manner, the illumination beam(s) generated by the one or more integrated LIDAR devices are scanned through a number of different orientations and effectively interrogate the surrounding 3-D environment under measurement. The diffracted beams projected into the surrounding environment interact with objects in the environment. Each respective integrated LIDAR measurement device measures the distance between the LIDAR measurement system and the detected object based on return light collected from the object. The optical phase modulation device is disposed in the optical path between the integrated LIDAR measurement device and an object under measurement in the surrounding environment. Thus, both illumination light and corresponding return light pass through the optical phase modulation device.

Figure 12:
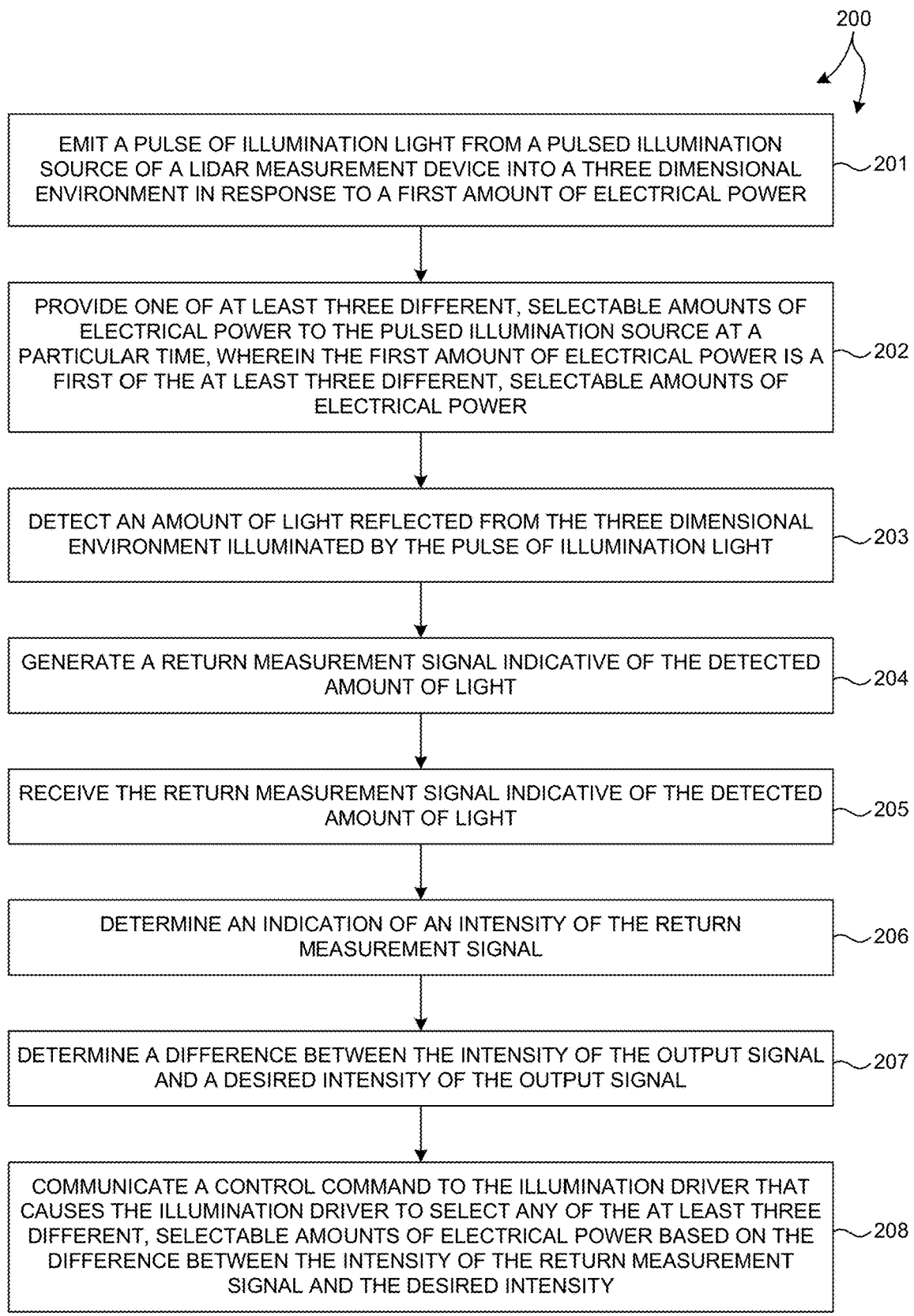
FIG. 12 depicts a flowchart illustrative of a method 200 of performing a LIDAR measurement by an integrated LIDAR measurement device implementing tiered illumination power control in at least one novel aspect.

FIG. 12 illustrates a flowchart of a method 200 suitable for implementation by a LIDAR measurement system as described herein. In some embodiments, LIDAR measurement systems 10, 100, and 120 are operable in accordance with method 200 illustrated in FIG. 23. However, in general, the execution of method 200 is not limited to the embodiments of LIDAR measurement systems 10, 100, and 120 described with reference to FIGS. 8, 7, and 1, respectively. These illustrations and corresponding explanation are provided by way of example as many other embodiments and operational examples may be contemplated.

In block 201, a pulse of illumination light is emitted from a pulsed illumination source of a LIDAR measurement device into a three dimensional environment in response to a first amount of electrical power.

In block 202, one of at least three different, selectable amounts of electrical power is provided to the pulsed illumination source at a particular time. The first amount of electrical power is a first of the at least three different, selectable amounts of electrical power.

In block 203, an amount of light reflected from the three dimensional environment illuminated by the pulse of illumination light is detected.

In block 204, a return measurement signal indicative of the detected amount of light is generated.

In block 205, the return measurement signal indicative of the detected amount of light is received.

In block 206, an indication of an intensity of the return measurement signal is determined.

In block 207, a difference between the intensity of the output signal and a desired intensity of the output signal is determined.

In block 208, a control command is communicated to the illumination driver that causes the illumination driver to select any of the at least three different, selectable amounts of electrical power based on the difference between the intensity of the return measurement signal and the desired intensity.

In general, the terms "integrated circuit," "master controller," and "computing system" may be broadly defined to encompass any device having one or more processors, which execute instructions from a memory medium.

Master controller 190 or any external computing system may include, but is not limited to, a personal computer system, mainframe computer system, workstation, image computer, parallel processor, or any other device known in the art.

It should be recognized that various steps described throughout the present disclosure may be carried out by return signal receiver IC 150, illumination driver IC 140, master controller 190, or another computer system. Moreover, different subsystems of the LIDAR measurement system 120, may include a computer system suitable for carrying out at least a portion of the steps described herein. Therefore, the aforementioned description should not be interpreted as a limitation on the present invention but merely an illustration.

In one example, program instructions 292 implementing methods such as those described herein may be transmitted over a transmission medium such as a wire, cable, or wireless transmission link. For example, as illustrated in FIG. 1, program instructions 292 stored in memory 291 are transmitted to processor 295 over bus 294. Program instructions 292 are stored in a computer readable medium (e.g., memory 291). Exemplary computer-readable media include read-only memory, a random access memory, a magnetic or optical disk, or a magnetic tape.

As depicted in FIG. 1, program instructions 292, memory 291, processor 295, and bus 294 are implemented as part of master controller 190. However, in other examples, program instructions implementing methods such as those described herein, memory, one or more processors, and a bus are implemented as part of return signal receiver IC 150. In some examples, program instructions implementing methods such as those described herein, memory, one or more processors, and a bus are also implemented as part of illumination driver IC 140.

In general, return signal receiver IC 150, illumination driver IC 140, and master controller 190 may be communicatively coupled to other devices in any manner known in the art. For example, the master controller 190 may be coupled to the return signal receiver IC 150 associated with an integrated LIDAR measurement device 130.

Master controller 190 may be configured to receive and/or acquire data or information from an integrated LIDAR measurement device 130 by a transmission medium that may include wireline and/or wireless portions. In this manner, the transmission medium may serve as a data link between the master controller 190 and other subsystems of the LIDAR measurement system 120.

Master controller 190 may be configured to receive and/or acquire data or information (e.g., LIDAR measurement results, compressed data sets, segmented data sets, feature sets, etc.) from other systems by a transmission medium that may include wireline and/or wireless portions. In this manner, the transmission medium may serve as a data link between the master controller 190 and other systems (e.g., memory on-board LIDAR measurement system 120, external memory, or external systems). For example, the master controller 190 may be configured to communicate measurement data 293 (e.g., LIDAR image information 105) from a storage medium (i.e., memory 291) to an external computing system via a data link. Moreover, the master controller 190 may receive data from other systems via a transmission medium. For instance, feature maps and location information determined by master controller 190 may be stored in a permanent or semi-permanent memory device (e.g., memory 291). In this regard, measurement results may be exported to another system.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:
a pulsed illumination source configured to emit a pulse of illumination light from the LIDAR device into a three dimensional environment in response to a first amount of electrical power;
an illumination driver configured to provide one of at least three different, selectable amounts of electrical power to the pulsed illumination source at a particular time, wherein the first amount of electrical power is a first of the at least three different, selectable amounts of electrical power;
a photosensitive detector configured to detect an amount of light reflected from the three dimensional environment illuminated by the pulse of illumination light and to generate a return measurement signal indicative of the detected amount of light; and
a computing system configured to:
receive the return measurement signal indicative of the detected amount of light;
determine an indication of a measured intensity of the return measurement signal;
determine a difference between the measured intensity of the return measurement signal and a desired intensity of the return measurement signal;
compare the difference between the measured and desired intensities of the return measurement signal to a plurality of threshold values, wherein the plurality of threshold values is selected based on the first amount of electrical power, and wherein a desired amount of electrical power is selected from the at least three different, selectable amounts of electrical power based on which threshold value of the plurality of threshold values is exceeded by the difference between the measured and desired intensities of the return measurement signal; and
communicate a control command to the illumination driver that causes the illumination driver to select the desired amount of electrical power.

2. The LIDAR device of claim 1, wherein a second amount of electrical power of the at least three different, selectable amounts of electrical power exceeds the first amount of electrical power, and wherein a third amount of electrical power of the at least three different, selectable amounts of electrical power exceeds the second amount of electrical power, and wherein the control command causes the illumination driver to select the second amount of electrical power when the difference between the measured intensity of the return measurement signal and the desired intensity of the return measurement signal exceeds a first threshold value of the plurality of threshold values, and wherein the control command causes the illumination driver to select the third amount of electrical power when the difference between the measured intensity of the return measurement signal and the desired intensity of the return measurement signal exceeds a second threshold value of the plurality of threshold values.

3. The LIDAR device of claim 2, wherein the first and second threshold values depend on the first amount of electrical power.

4. The LIDAR device of claim 2, wherein the first and second threshold values vary by a fixed scaling factor.

5. The LIDAR device of claim 2, wherein the first and second threshold values depend on whether the difference between the measured intensity of the return measurement signal and the desired intensity of the return measurement signal is a positive value or a negative value.

6. The LIDAR device of claim 2, wherein the first and second threshold values are characterized by a nonlinear function.

7. The LIDAR device of claim 2, wherein the return measurement signal includes one or more return measurement pulses, and wherein the indication of the measured intensity of the return measurement signal is a peak value of the one or more return measurement pulses.

8. The LIDAR device of claim 2, wherein the return measurement signal includes one or more return measurement pulses, and wherein the indication of the measured intensity of the return measurement signal is an average value or a mean value of the one or more return measurement pulses.

9. A LIDAR measurement system, comprising:
a pulsed illumination source configured to emit a pulse of illumination light from the LIDAR device into a three dimensional environment in response to a first amount of electrical power;
an illumination driver configured to provide one of at least three different, selectable amounts of electrical power to the pulsed illumination source at a particular time, wherein the first amount of electrical power is a first of the at least three different, selectable amounts of electrical power;
a photosensitive detector configured to detect an amount of light reflected from the three dimensional environment illuminated by the pulse of illumination light and to generate a return measurement signal indicative of the detected amount of light; and
computer-readable instructions stored on a non-transitory, computer-readable medium, the computer-readable instructions comprising:
code for causing a computing system to receive the return measurement signal indicative of the detected amount of light;
code for causing the computing system to determine an indication of a measured intensity of the return measurement signal;
code for causing the computing system to determine a difference between the measured intensity of the return measurement signal and a desired intensity of the return measurement signal;
code for causing the computer system to compare the difference between the measured and desired intensities of the return measurement signal to a plurality of threshold values, wherein the plurality of threshold values is selected based on the first amount of electrical power, and wherein a desired amount of electrical power is selected from the at least three different, selectable amounts of electrical power based on which threshold value of the plurality of threshold values is exceeded by the difference between the measured and desired intensities of the return measurement signal; and
code for causing the computing system to communicate a control command to the illumination driver that causes the illumination driver to select the desired amount of electrical power.

10. The LIDAR measurement system of claim 9, wherein a second amount of electrical power of the at least three different, selectable amounts of electrical power exceeds the first amount of electrical power, and wherein a third amount of electrical power of the at least three different, selectable amounts of electrical power exceeds the second amount of electrical power, and wherein the control command causes the illumination driver to select the second amount of electrical power when the difference between the measured intensity of the return measurement signal and the desired intensity of the return measurement signal exceeds a first threshold value of the plurality of threshold values, and wherein the control command causes the illumination driver to select the third amount of electrical power when the difference between the measured intensity of the return measurement signal and the desired intensity of the return measurement signal exceeds a second threshold value of the plurality of threshold values.

11. The LIDAR measurement system of claim 10, wherein the first and second threshold values depend on the first amount of electrical power.

12. The LIDAR measurement system of claim 10, wherein the first and second threshold values vary by a fixed scaling factor.

13. The LIDAR measurement system of claim 10, wherein the first and second threshold values depend on whether the difference between the measured intensity of the return measurement signal and the desired intensity of the return measurement signal is a positive value or a negative value.

14. The LIDAR measurement system of claim 10, wherein the first and second threshold values are characterized by a nonlinear function.

15. The LIDAR measurement system of claim 10, wherein the return measurement signal includes one or more return measurement pulses, and wherein the indication of the measured intensity of the return measurement signal is a peak value of the one or more return measurement pulses.

16. The LIDAR measurement system of claim 10, wherein the return measurement signal includes one or more return measurement pulses, and wherein the indication of the measured intensity of the return measurement signal is an average value or a mean value of the one or more return measurement pulses.

17. A method comprising:
emitting a pulse of illumination light from a pulsed illumination source of a LIDAR measurement device into a three dimensional environment in response to a first amount of electrical power;
providing one of at least three different, selectable amounts of electrical power to the pulsed illumination source at a particular time, wherein the first amount of electrical power is a first of the at least three different, selectable amounts of electrical power;
detecting an amount of light reflected from the three dimensional environment illuminated by the pulse of illumination light;
generating a return measurement signal indicative of the detected amount of light;
receiving the return measurement signal indicative of the detected amount of light;
determining an indication of a measured intensity of the return measurement signal;
determining a difference between the measured intensity of the return measurement signal and a desired intensity of the return measurement signal;
comparing the difference between the measured and desired intensities of the return measurement signal to a plurality of threshold values, wherein the plurality of threshold values is selected based on the first amount of electrical power, and wherein a desired amount of electrical power is selected from the at least three different, selectable amounts of electrical power based on which threshold value of the plurality of threshold values is exceeded by the difference between the measured and desired intensities of the return measurement signal; and
communicating a control command to the illumination driver that causes the illumination driver to select the desired amount of electrical power.

18. The method of claim 17, wherein a second amount of electrical power of the at least three different, selectable amounts of electrical power exceeds the first amount of electrical power, and wherein a third amount of electrical power of the at least three different, selectable amounts of electrical power exceeds the second amount of electrical power, and wherein the control command causes the illumination driver to select the second amount of electrical power when the difference between the measured intensity of the return measurement signal and the desired intensity of the return measurement signal exceeds a first threshold value of the plurality of threshold values, and wherein the control command causes the illumination driver to select the third amount of electrical power when the difference between the measured intensity of the return measurement signal and the desired intensity of the return measurement signal exceeds a second threshold value of the plurality of threshold values.

19. The method of claim 18, wherein first and second threshold values depend on whether the difference between the measured intensity of the return measurement signal and the desired intensity of the return measurement signal is a positive value or a negative value.

20. The method of claim 18, wherein the return measurement signal includes one or more return measurement pulses, and wherein the indication of the measured intensity of the return measurement signal is a peak value, and average value, or a mean value of the one or more return measurement pulses.

* * * * *